July 19, 1938.   L. H. BEVARD   2,124,283

ELECTRODE HOLDER

Filed Sept. 24, 1936

INVENTOR.
Lawrence H Bevard
BY
Rodney Bedell
ATTORNEY.

Patented July 19, 1938

2,124,283

UNITED STATES PATENT OFFICE 2,124,283

ELECTRODE HOLDER

Lawrence H. Bevard, St. Louis, Mo.

Application September 24, 1936, Serial No. 102,319

12 Claims. (Cl. 219—8)

The invention relates to the art of electric welding and consists in an improved tool for manual manipulation of the electrode and the conveying of current from a source of supply to the electrode.

Holders of the type referred to are subjected to rough usage and to high temperatures caused by the resistance in the electrode to the passage of the welding current therethrough, and exposed metal parts of the holder may contact with the work, short-circuiting the welding current with the resulting arcing which may be injurious to the tool and work and dangerous to the operator.

One object of the present invention is to simplify the holder and particularly the mechanism for spreading its jaws to grip the electrode. More specifically it is desired to avoid pivot pins, threaded elements and light springs, all of which are subject to deterioration from heat and the electric current and are likely to be rendered ineffectual by accumulation of dirt, knocks from adjacent articles, and high heat.

Another object of the invention is to render the tool more comfortable for the operator by minimizing the contact between the handle and the current conveying metal parts and by providing for the circulation of air around the latter-mentioned parts where they are close to the handle.

Another object of the invention is to surround the electrode holding metal members within an insulating enclosure adapted to prevent short-circuiting of the electric current by accidental contact of the metal portions of the tool but without restricting the application of the electrode to the tool and the free handling of the electrode with the tool.

Another object of the invention is to provide for the ready removal of dirt and debris from the tool by facilitating the disassembly of the electrode clamping jaws and the mechanism for spreading them apart.

Another object of the invention is to adapt the electrode holding parts for clamping the electrode at any convenient angle relative to the axis of the tool.

These and other detailed objects of the invention will be apparent from the following description, reference being had to the accompanying drawing, in which—

Figure 1:
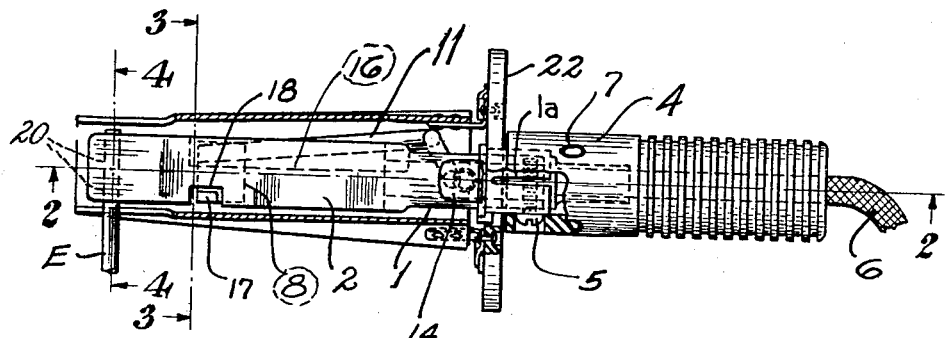
Figure 1 is a side view of the tool with portions sectioned and broken away to more clearly illustrate the construction.

The device includes a body portion 1, preferably of tubular form and having a pair of jaws 2 and 3 extending from one end. The jaws may be formed from a split extension of one end of body 1 or may be formed separately and welded to the body. Preferably they are of spring material and are initially distorted so that the spring tendency is to thrust the ends of the jaws together. The other end of body 1 is split at 1a and a handle 4 of insulating material is mounted on this split end, the handle and body overlapping each other for a relatively short distance and a screw 5 is threaded into one side of the body with its end bearing against the other side and serving to spread the body to hold the handle in place.

A conduit 6 for the welding current is received through the outer end of handle 4 and is anchored to the inner end of body 1 in the usual manner. Conduit 6 is substantially smaller in diameter than the interior of the handle and the handle is provided with a plurality of transverse openings 7 communicating with the interior of the handle adjacent to the inner end of body 1. This arrangement provides free circulation of air substantially throughout the interior of the handle and serves to dissipate heat resulting from the resistance to the welding current.

Means for spreading the jaws apart include a cam 8 in the form of a rectangular bar having its diagonally opposite edges 9 and 10 bearing against corresponding flat faces of jaws 2 and 3. A lever 11 for operating cam 8 is rigid therewith and extends from one end of the cam longitudinally of the jaws to a point adjacent the handle where it is offset, as indicated at 12, to provide a hand engaging arm 13 extending alongside of the handle and preferably covered with insulation 14. A tongue 15 projects laterally from lever 11 and passes through an aperture in the body. This simple operating device is free of pin bearings, threaded parts and other mechanism likely to be injured by heat surrounding the device or the hard usage to which it is submitted.

Preferably jaw 3 for a substantial portion of its length is narrower than jaw 2, as indicated at 16 (Figure 1), and lever 11 extends into the space which would be filled by the jaw if it was of maximum width throughout its length. Thereby lever 11 overlies the corresponding end of cam 8 and its forward portion does not project substantially beyond the jaws to interfere with the manipulation of the electrode in restricted spaces. Preferably a lug 17 on cam 8 projects into a recess 18 in jaw 2 and cooperates with tongue 15 in positioning the cam and lever longitudinally of the device.

The leverage of the operator's grip against jaw 3 is less than the leverage against jaw 2. Accordingly there is a tendency to apply greater thrust against jaw 2, but due to the difference in the widths of the two jaws, jaw 3 will yield more easily than if it was of constant maximum width throughout its length. Hence the effect of the leverage differential is equalized and both jaws are distorted to substantially the same degree.

Figures 2, 4:
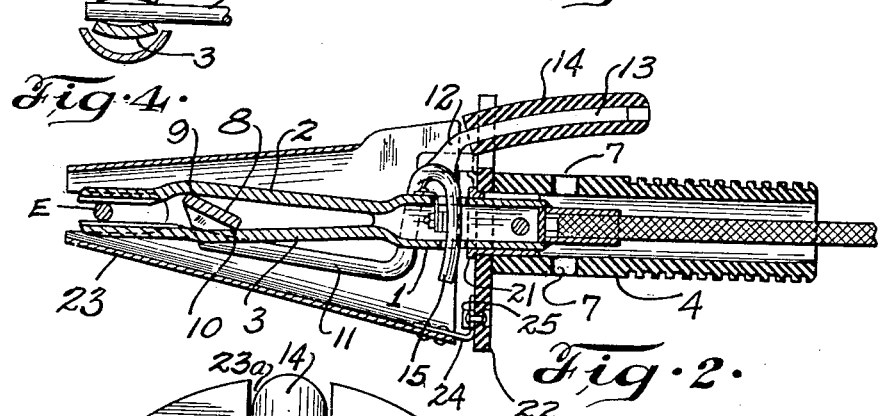
Figure 2 is a longitudinal section taken substantially on the line 2—2 of Figure 1.
Figure 4 is a detail transverse section through the electrode clamping portions of the jaws and is taken approximately on the line 4—4 of Figure 1.
Figure 3:
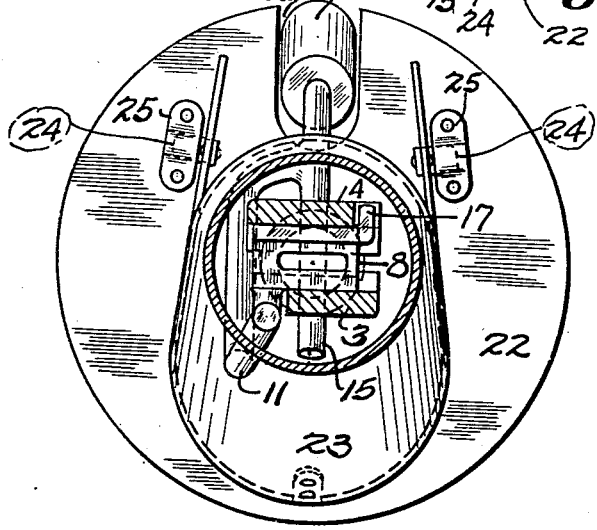
Figure 3 is a transverse section taken substantially on the line 3—3 of Figure 1.
Figure 5:
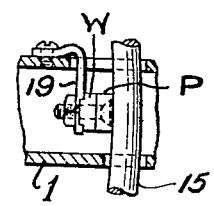
Figure 5 is an enlarged detail of a portion of the structure shown in Figure 2.

If a separate tool be used to force jaws 2 and 3 apart to a substantially greater extent than is shown in Figure 2, lever 11 may be swung in a counterclockwise direction far enough to dislodge tongue 15 from body 1, whereupon the lever and cam may be removed from the remainder of the structure and splatter metal or other debris which may have collected in the space between the jaws and around the body may be easily removed and the lever and cam again applied. This disassembly and assembly operation is effected without removing any pins, screws, or other troublesome holding elements which may be easily misplaced.

Preferably a flat spring 19 is secured at one end to body 1 and its free end carries a fibre washer W and a metal wear plate P which frictionally engages tongue 15 to prevent free play of the latter and rattling of the lever and cam when pressure on the cam is released due to the presence of an electrode E between the clamping jaws.

Preferably the electrode engaging portions of the jaws are provided with opposing slightly concave faces, as shown exaggeratedly in Figure 4, and this arrangement enables the operator to obtain a satisfactory grip upon the electrode irrespective of the angle between it and the longitudinal axis of the tool. It is well known that electric welders like to adjust the angle of the electrode to suit their personal preference and this shaping of the clamping portions of the jaws accommodates such preference. A groove 20 may be provided in one or both of the jaws to more securely hold the electrode in at least one definite position.

Held between a shoulder 21 on body 1 and the adjacent end of handle 4 is a rigid disc 22 of insulating material having a notch 23a to receive the inner end of lever 11—13. A conical shaped shield 23 of insulating material has its base adjacent shield 22 and its smaller end terminating adjacent the outer ends of jaws 2 and 3. The shield has an opening at one side to accommodate lever 11—13. Shield 23 is readily applied to and removed from disc 22 by means of prongs 24 attached to the conical shield and inserted in sockets provided by clips 25 attached to the disc shield. It will be understood that shield 23 is of flexible springy material, such as fibre, and is readily compressed to release prongs 24 from clips 25 so that the shield may be readily detached, without interrupting operations, if it is desired to insert the jaws into a recess too restricted to receive the conical shield, or if it is desired to clean the tool. Ordinarily the shield will be applied as shown enclosing the jaws and operating lever and preventing accidental contact of the jaws and lever with the work.

Variations in the details of the device may be made without departing from the spirit of the invention and the exclusive use of such modifications coming within the scope of the claims is contemplated.

I claim:

1. In an electrode holder, a body structure including a pair of electrode clamping jaws having opposing flat faces, said jaws being yieldingly thrust towards each other, a cam between said jaws comprising a flat bar with diagonally opposite corners seated respectively on said faces, a lever rigid with said bar and extending transversely of said edges and longitudinally of said jaws for manual manipulation to rotate said bar to spread said jaws, there being interengaging on said lever and body for holding the same against relative movement longitudinally of said jaws.

2. In an electrode holder, a body structure including a pair of electrode clamping jaws having opposing flat faces, said jaws being yieldingly thrust towards each other, a cam between said jaws comprising a flat bar with diagonally opposite corners seated respectively on said faces, a lever rigid with said bar and extending transversely of said edges and longitudinally of said jaws and including a projecting element slidably engaging an opening in said body to hold said cam and lever against movement longitudinally of said jaws.

3. In an electrode holder, a body structure including a pair of electrode clamping jaws having opposing flat faces, said jaws being yieldingly thrust towards each other, a cam between said jaws comprising a flat bar with diagonally opposite corners seated respectively on said faces, said jaws being of spring material and rigidly secured to each other at one end and one of said jaws being narrower than the other throughout a substantial portion of its length extending from the point where the jaws are secured together, a lever for operating said cam extending alongside of the edge of the narrow jaw and terminating in a hand engaging portion, the edge of said cam nearest said hand engaging portion bearing on the narrower of said jaws and the edge of said cam farthest away from said hand engaging portion bearing on the wider of said jaws.

4. A structure as set forth in claim 1 which also includes friction means engaging the lever to prevent free movement of the same when there is no pressure on the cam from the jaws.

5. In an electrode holder, a body member comprising a tubular section, jaws extending outwardly therefrom, said jaws being yieldingly thrust towards each other, a one-piece structure comprising a cam element located between said bars, a lever for tilting said cam element and terminating in a hand engaging portion and provided with a lateral projection, said body being provided with a transverse opening for receiving said projection to hold said structure in the desired position.

6. A structure as set forth in claim 5 which also includes a spring housed in said body member and engaging said projection to hold said structure against play when there is no pressure on the cam.

7. In an electrode holder, a body structure including a pair of electrode clamping jaws yieldingly thrust towards each other, a cam between said jaws for forcing them apart, a lever rigid with said cam, extending longitudinally of said jaws, terminating in a hand engaging portion and having a lateral projection in engagement with said body structure, said engagement and the pressure of said jaws on said cam serving normally to retain said cam and lever in assembled relation with said body structure, said cam and lever being readily removable from said body structure and jaws when said jaws are forced apart by external means.

8. In an electrode holder, a body having electrode-clamping metallic jaws, a handle mounted on said body and arranged to receive a conduit secured to said body, a jaw spreading cam between said jaws, a cam actuating lever extending alongside of said jaws, and a relatively light readily detachable insulating shield carried by said body and spaced from said body and handle and spaced laterally from but surrounding said jaws, cam and lever and extending from said handle to a point near the electrode engaging terminals of said jaws.

9. In an electrode holder, a body having electrode-clamping metallic jaws, a jaw spreading device mounted directly on said body, a handle mounted on said body and arranged to receive a conduit secured to said body, a relatively light readily detachable cone shaped insulating structure extending from said handle substantially throughout the length of said jaws and enclosing the same and said device and apertured near its outer end to receive an electrode extending transversely of said jaws without exposing a large area of said jaws, thereby avoiding short-circuiting of the welding current by accidental contact between said jaws and the work.

10. In an electrode holder, a body having a pair of electrode clamping jaws yieldingly thrust towards each other, a cam between said jaws for forcing them apart, said cam bearing on opposing faces of said jaws, and a lever for operating said cam rigid therewith and normally extending alongside of said jaws, a handle mounted on said body and an insulating shield mounted on said body and spaced laterally from but surrounding said jaws and cam and lever and extending from said handle to a point near the electrode engaging terminals of said jaws.

11. In an electrode holder, a body having electrode-clamping metallic jaws, a handle mounted on said body and arranged to receive a conduit secured to said body, a disc of insulating material disposed transversely of the end of said handle near said jaws, clips on the outer face of said disc, a conical member of insulating material having elements about its base for ready attachment to and detachment from said clips, said member enclosing said jaws but being apertured near its smaller end to accommodate passage laterally therethrough of an electrode held by said jaws.

12. In an electrode holder, a body including a portion to be grasped by the hand of the operator, jaws projecting from said body and being yieldingly thrust towards each other, means for spreading said jaws including a lever extending alongside of said jaws and having an arm extending over said handle for manipulation by the operator, an insulating disc at the forward end of said handle having an opening provided for the passage of said arm, and an insulating sleeve extending forwardly from said disc and enclosing said jaws and lever and being mounted on said disc and readily detachable therefrom without disassembling said lever and jaws.

L. H. BEVARD.